Inventor:
Thos. A. Banning Jr.

Nov. 16, 1965     T. A. BANNING, JR     3,217,730
MULTIPLE SUPPLY BALANCED VALVE, PRESSURE
REDUCING VALVES, AND THE LIKE
Original Filed Feb. 3, 1956     7 Sheets-Sheet 5

Inventor:

Inventor:

Inventor:

United States Patent Office 3,217,730
Patented Nov. 16, 1965

3,217,730
MULTIPLE SUPPLY BALANCED VALVE, PRESSURE REDUCING VALVES, AND THE LIKE
Thomas A. Banning, Jr., 5520 S. Shore Drive, Chicago, Ill.
Original application Feb. 3, 1956, Ser. No. 563,306. Divided and this application May 5, 1961, Ser. No. 107,948
12 Claims. (Cl. 137—98)

This application is a division of my co-pending application, for Letters Patent of the United States, for Improvements in Mixtures of Gases, Life Sustaining Atmospheres, and Means for Producing the same and controlling the Pressures and Proportions Thereof, Serial No. 563,306, which became abandoned after Feb. 27, 1962, for want of prosecution.

This invention relates to multiple supply, balanced valve, pressure reducing valves, and the like. Broadly stated the invention concerns itself with a unit including two or more high pressure fluid (generally gas or vapor) supply connections, pressure reducing valve arrangements for each of such supply connected elements, all such reducing valve arrangements delivering to a common mixing chamber or passage wherein the reduced pressure fluids are brought together and mixed; together with interconnections between such reducing valve arrangements, such interconnections being so constituted that the pressures of all of the reduced pressure fluid bodies are exactly the same, so that no one or more of the fluids shall, in its reduced pressure state, dominate any or all of the other reduced pressure fluids. Under the condition of such exactly equalized reduced pressures of all of the fluids, such several fluids may be mixed together in desired proportions by simple mixing valve arrangements constituted to determine the proportions of the several components which shall be contained in the final mixture.

The embodiment of such unit to be hereinafter illustrated and described, is one including two of the balanced pressure reducing valve elements, wherein the delivery or reduced pressures of the two components produces balancing forces which act in opposition to each other in such fashion that slight inequalities of pressure of the two delivered components serve to immediately produce countervailing operations of nature to reduce the delivered pressure of the slightly higher pressure component, and correspondingly, to raise the delivered pressure of the slightly lower pressure component, until an exact balance is again produced with equalization of such two delivered pressures. These slight corrections are produced automatically and continuously and instantly, to in effect maintain the two delivered pressures exactly equal within available tolerances of manufacture of physical elements of the two reducing valves.

The principles of construction and operation which will be hereinafter illustrated and described may also be incorporated in balanced pressure reducing valve arrangements capable of producing the desired results for the cases of more than two supplied pressure fluid components.

It is a further object of the invention to provide such device with arrangements such that the supplied pressures of the two or more components may be widely different, but nevertheless the reduced delivered pressures of both or all such components will be exactly equalized. It is also an object of the invention to provide such a device which is capable of handling widely different kinds and characteristics of such fluids (generally, gases or vapors) even when the thermodynamic characteristics of such several gases or vapors are widely different from each other.

A further object of the invention relates to the provision of simple but effective means to enable change or adjustment of the delivered pressure to which the several component fluids are brought, with assurance that any such change, and the new delivered pressure adjustment to which the change has been made, will result in accurate and assured delivery of the several components to exactly the same newly determined pressure. In connection with the foregoing it is a further and more specific object to provide a delivered-pressure adjusting means which is so constituted that the delivered pressures of the plurality of reducing valve elements act on diaphragm elements which in turn act against a common interconnection element by which the delivered pressures of the several reducing valves are brought into direct opposition to each other without the interposition of any movable element which would interpose even slight friction in opposition to the balancing effects between the several delivered pressures. The changes in value of predetermined delivered pressure are made by adjustment of such delivered-pressure adjusting means; but when such adjustment has been made to correspond to a newly determined delivered pressure, the delivered pressures of the several diaphragm elements still act in direct opposition to each other, but under a newly adjusted control force, corresponding to the newly determined delivered pressure.

A further feature of the invention relates to the provision of an improved form of mixing chamber, with valve means from the two or more delivered pressure spaces, to a common delivery passage through which the mixture of the gases is delivered; such valve means being so constituted that the port areas produced by such valve means, between the several delivered pressure spaces, for various positions of such valve means, bear definite relations to each other, corresponding to the desired relative rates of delivery of the reduced-pressure components. The embodiment hereinafter disclosed is such that as one of the components is to have its proportion of the total delivery raised, the other component has its proportion of the toal delivery reduced in proper amount to maintain the desired total rate of delivery constant, but with the proportions of the several components changed as desired to meet intended delivery specifications.

In connection with the foregoing feature of the invention, it is a further and more specific object of the invention to enable the incremental rate of changes of the several components of the reduced-pressure mixture, to be varied as the valve element is advanced by equal increments, but with assurance that at all times the total rate of delivery of the mixture shall remain constant, but with the proportions of the several components progressively varied according to a varying incremental rate of such variation. In connection with the foregoing objective it is a further more specific objective to provide a construction of valve and mixing chamber such that the second differential of change in the proportions of the several components may be readily changed from time to time, by substitution of various "mask plates" or elements, having orifices formed in them to meet the requirements of the various changes in incremental rates which may be desired.

In connection with the foregoing it is a further object of the invention to provide visual indicating or other indicating means, to inform of the user of the equipment as to the delivered pressure at which the device will deliver the mixture of fluids, for a given setting of the delivered-pressure adjusting means; and to also inform the user of the equipment as to the proportions in which the several components of the mixture are being delivered, corresponding to such indicated delivery-pressure. Upon insertion of a different mask plate element into the device, a different proportion indicating element may also be substituted for that previously incorporated in the valve indicating portion of the device; such newly substituted proportion indicating element being constituted to indicate the proportions corresponding to the newly substituted mask plate.

Another feature of the invention relates to the provision of means, in connection with the plural component pressure-reducing valve herein disclosed, for continuously and automatically adjusting the same from time to time according to the reduced-pressure needs of the mixture of gases or vapors which are delivered from the unit. As an instance of such a use, the improvements hereinafter to be detailed, may be incorporated in a pressure reducing valve used for delivering a mixture of helium and ordinary air under increasing pressures as a diver descends to lower depths, under which operational conditions it is desirable to vary the proportions of the helium and such ordinary air. I have, in the present disclosures, included means to produce such variation of proportions automatically, and according to the varying depths at which the diver may be operating from time to time. I have also included means whereby the diver may, himself, vary the proportions of the components manually from his under-water position.

The hereinafter detailed disclosures are also such that the pressure-reducing elements and control thereof, may be operated independently of the operations of the mixing valve and proportion controlling elements. Thus, on occasion the relative proportions of the components may be produced at other than values to correspond with the reduced-pressure delivery value. For example, the device may be operated for varying delivery pressures under the condition of constant ratio of the components; or the device may be operated under the condition of varying delivered ratios of the components, and with constant delivery pressure. That is to say, the device may be operated with a given and unchanging setting of the relative proportions of the components, while the delivered-pressures are varied; or the device may be operated with a constant setting of the delivery pressure, but with changing ratio between the several components. Means are provided for giving visual or other indication of the setting of the delivery pressure; and also for giving visual or other indication of the ratio between the several components of the mixture.

A further feature relates to the provision of a construction such that the two sections of a dual reducing unit, of the plural type herein disclosed, can be easily adjusted when necessary, to bring them into proper coordination, and in order to make the proper initial adjustments. This arrangement is such that these adjustments can be made from the outside of the device, and after it has been assembled.

A further feature and object of the invention is to provide an arrangement such that the parts which are subject to frictional contact during operation, may be effectively lubricated. This result is accomplished by placing these parts in a sealed compartment which may be fully or partially filled with proper lubricant.

Another object is to provide a form of reducing valve which is provided with large openings for flow of the high pressure gas into the low pressure chamber, so that the expansion of the gas will take place under such conditions as to eliminate excessive cooling due to such expansion; thereby preventing danger of freezing of parts together, due to such cooling, and also eliminating danger of stoppage of flow of gas during normal service.

It is a further object to make provision for establishing the zero point of the spring balance at the absolute zero pressure condition, if desired, so that the device may be used for delivery of gases at pressures considerably below sea-level pressure; and also to make it possible to secure a more accurate response of the valve operations even when used for reduction of pressures to delivered pressures which are below sea-level pressure. By the term "absolute pressure" or like terms, as used herein, I mean the pressure with reference to absolute zero pressure, or what is commonly termed a perfect vacuum.

Other objects and uses of the invention will appear from a detailed description of the same, which consists in the features of construction and combinations of parts hereinafter described and claimed.

Figure 13:
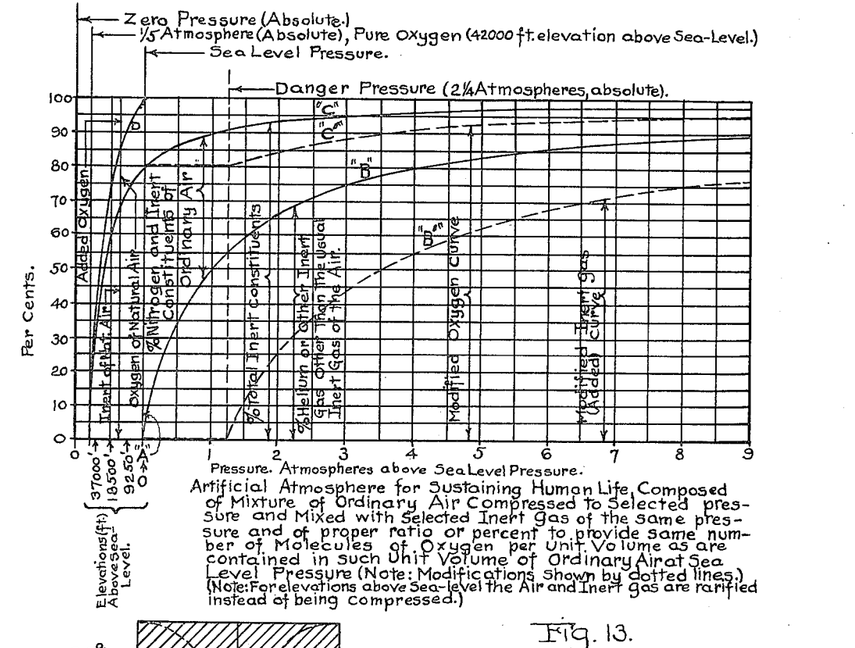
FIGURE 13 shows by means of curves the variation of the ratios of the components of a typical mixture with change of delivery pressure, the curves being carried backwardly from the sea level pressure line, to show that for pressures lower than sea level the percentage of oxygen should be increased in order to ensure the same number of molecules of oxygen per cubic centimeter as are provided in ordinary air at sea level pressure.

Referring now to FIGURE 13, I have therein shown by means of curves the ratios of pressures to percentages for various conditions of use of mixtures of gases at various pressures and in varying ratios. Pressures are shown by the abscissae and percentages are shown by the ordinates. These curves show the relationships between such pressures and ratios or percentages of components of an artificial atmosphere, intended for supply to and use by a deep-sea diver, or for use under conditions similar to such deep-sea diving operations. The sea level pressure is shown by the line A. The line C shows the oxygen curve for a mixture in which the percentage of oxygen is varied with variation of pressure in such manner that there is always the same number of molecules of oxygen in each cubic centimeter as at sea level condition of natural air. Thus, at sea level pressure this curve passes through the point of 80% (there being substantially 80% inert gases in natural air, actually 79.01%), and there being substantially 20% oxygen in natural air (actually 20.99%). The figures shown on the curve are, however, very close to theoretical. As the pressure is increased above the sea level pressure, the percentage of oxygen decreases, being the distance between the curve C and the 100% line, so that, for example, at 3 atmospheres above sea level pressure the percentage of inert gas is shown as 95%, and that of oxygen as 5%; or at 9 atmospheres above sea level pressure, the percent inert is shown as 98% and the percent oxygen as 2%; but in all these cases there will be the same number of molecules of oxygen per cubic centimeter as at sea level pressure, so that the breather will receive at each breath the same full number of molecules of oxygen.

Conversely, the curve C has been carried backwardly from the line A to pressures lower than sea level pressure, such as exist in higher altitudes. The curve C shows increasing percentages of oxygen for such reduced pressures, falling to 60% inert gases and 40% oxygen at one-half atmosphere absolute, and falling to 0% inert gases and 100% oxygen at ⅕ atmosphere absolute, corresponding to an elevation of substantially 38,000 feet above sea level. That is to say, at ½ atmosphere absolute, corresponding to 17,000 feet above sea level there should be substantially 60% inert gases and 40% oxygen to provide a normal oxygen content gas mixture; and at ⅕ atmosphere absolute, corresponding to 38,000 feet above sea level there should be a 100% oxygen content gas mixture; and at other intermediate pressures or elevations there should be correspondingly proportioned gas mixtures, as shown by the curve C. With all such mixtures, the breather would receive a full supply of oxygen at each breath, and thus should not experience discomfort due to shortage of oxygen. I therefore contemplate variations of the oxygen content both above and below sea level pressure operations; and the reducing valve units herein disclosed are capable of producing the desired mixture of oxygen (or other gas) and inert (or other gas), under controlled conditions of operation of such units.

The curve B shows variation of percent of added inert gas when the mixture comprises compressed natural air and other compressed inert gas added thereto; both of such compressed gases being brought to the same controlled reduced pressure, and then mixed together under such equality of pressures in the controlled ratio of such gases to each other. The space between the lines B and C represents the proportion of nitrogen, and the space below the line B represents the proportion of such added inert gas, such as helium, when the mixture being produced comprises a mixture of natural air and helium. Thus, for a pressure of 3 atmospheres above sea level pressure the inert components would comprise 20% compressed inert constituents of the original natural air, and 75% compressed helium, being a total of 95% inert constituents; and there would remain 5% oxygen content, with the same number of molecules of oxygen per cubic centimeter as at sea level pressure. Or, at 9 atmospheres above sea level, the percent inert components of the original compressed air would be 8%, and the percent added compressed helium, or other added inert gas, would be 90%, being a total of 98% compressed inert constituents.

The added inert gas in the examples given above may be helium, argon, krypton, xenon, or other gas suitable for the purposes of use to which the mixture to be placed; but helium has been found to be desirable for various reasons. Sometimes a combination of two or more such added gases may be used. In any case the amount of the nitrogen, measured as percent of the mixture, will thereby be lowered, with attendant benefits well understood in the arts. In some cases all of the added inert gas might be nitrogen, under the conditions of controlled reduced pressure (from the source of supply), and controlled ratio of the total inert gas to the other component, such as oxygen.

In FIGURE 13 I have also shown, by the curves C' and B' the percentages of oxygen and of added inert gas to obtain the desired constancy of oxygen content, when the base pressure is assumed to be 1¼ atmospheres above sea level pressure, instead of sea level pressure itself. In the case of curve C' the percent oxygen has been shown constant at 80% up to the pressure of 1¼ atmospheres above sea level; after which, for higher pressures such curve rises in proper form to establish or maintain the same number of molecules of oxygen per cubic centimeter as are contained in a cubic centimeter of natural air at 1¼ atmospheres above sea level pressure, the inert gases of the mixture including such proportions of added inert gas as are needed to conform to the requirements of the curve. For example, at a pressure of 3 atmospheres above sea level pressure, the oxygen content would be about 12% (instead of 5% as in the previous example); and the total inert gases would be 88% (instead of 95% as in the previous example); and at a pressure of 9 atmospheres above sea level pressure, the oxygen content would be 4½% (instead of 2% as in the previous example), and the total inert gases would be 95½% (instead of 98%, as in the previous example). Under these conditions, too, the nitrogen content would fall from 80% at 1¼ atmospheres above sea level pressure, to 18% at 9 atmospheres above sea level pressure.

Figure 14:
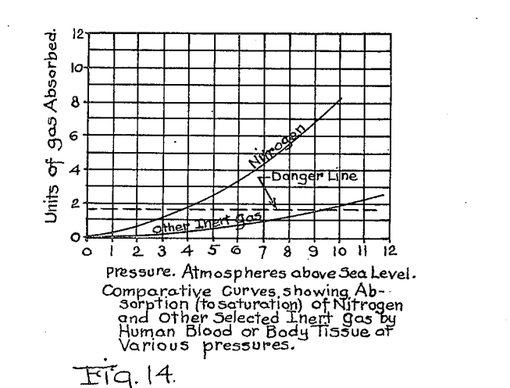
FIGURE 14 shows, by means of curves, the variation of absorption of the inert gas by the blood stream and bodily tissues with variations of pressure, both for nitrogen and for another inert gas; the curves being typical, and being related to a danger line.

In FIGURE 14 I have shown more or less diagrammatically, the fact that the units of compressed inert gas absorbed by human blood and tissues, is less in the case of helium or other inert gases, than the absorption of nitrogen, and thus that a greater degree of compression may be safely used in such operations as deep-sea diving operations, than when all of the inert gas is nitrogen. The "danger line" (corresponding to substantially 1¼ atmospheres above sea level) is also shown on the chart of this figure.

The ability to provide the desired mixture of gases under exact control of the ratios of such mixture's components, requires that both of the gases of such mixture shall be delivered to the mixing valve under close control of both pressures and ratios, and that the connections from the reducing valves for the components, to the mixing chamber shall be the same length, and very short. I have therefore provided a dual or duplex reducing valve and mixing valve arrangement complying with the above stated requirements. The same is now described in detail as follows:

Referring to FIGURES 1 to 12, inclusive, there are the two reducing valves 25 and 26, and the mixing valve and chamber unit 27, immediately adjacent thereto. Each reducing valve includes the generally cylindrical chamber 28 of cup shape provided with the inner end flange 29. There is also the intermediate cylindrical chamber 30, having the flanges 31 and 32. At the inner ends of the chambers 28 of the two reducing valves are the diaphragms 33 and 34, each including a thin flexible corrugated plate or diaphragm 35, and the two rigid central plates 36 and 37 which are secured to its central portion unyieldingly but allow the diaphragm as a whole to flex easily. The peripheral portions of these diaphragms are clamped firmly between the flanges 29 and the rings 38 which are set against said peripheral portions and secured together.

The outer or cup portion of each of the chambers 28 is provided with a relatively large opening which is closed by a plug 39, preferably with the intervening washer 40. Within each of the chambers 28 there is supported the high pressure chamber 41, having the three outwardly projecting arms 42, 43 and 44 by which it is supported in place; and the inner end of each of the high pressure chambers 41 is provided with the diaphragm 45 of sufficient flexibility to allow for flexing during the opening and closing operation of the valve, but of sufficient strength to resist the high pressure gas within the chamber. The peripheral portion of each diaphragm 45 is secured to the inner end of the chamber 41 by the ring 46.

The outer end of each of the high pressure chambers is provided with a removable ring 47, screw threaded into place, and provided with the outwardly extending circular ridge or seat 48, having a relatively sharp edge, and the sealing edge portion thereof is preferably ground to ensure a gas tight fit. The opening which receives the plug 39 already referred to is large enough to permit access to the ring 47, and other parts, and removal thereof from time to time for replacement or adjustment through the unplugged opening.

There is a stem 49 which extends through the diaphragms 35 and 45, and is secured rigidly thereto by the set screws 50, 51, 52 and 53 (the portion 53 being shown for convenience as a flange on the stem itself). By these set screws the diaphragms are caused to operate with flexing movement as a unit, and also their movements are controlled.

Each stem 49 carries the valve member for the high pressure valve which it controls. This is in the form of a slightly flexible disk 54 which is clamped between the set screws 55 and 56 on the stem, and the edge portion of such slightly flexible disk carries the ring shaped seating member 57 in the form of a pair of rings clamped around the edge portion of the disk 54. The inner one of these rings serves to seat against the seat 48, and for this purpose its inner face is preferably ground accurately. Also, the flexibility of the disk 54, while being sufficient to permit accurate seating of the ring against the stationary seat, still is strong enough to resist the internal pressure of the gas within the chamber 41, so that the seating and unseating of the ring are properly controlled by the stem 49.

The effective areas of the disk 45 and of the valve, to the line of contact with the stationary seat, are equal to each other, so that the internal pressure within the chamber 41 is balanced, and only very slight forces need be exerted on the stem 49 to effect opening and closing movements of the valve. It will, of course be understood that the stem itself is subjected to a large force between the positions of the disk 54 and diaphragm 45, but this force is purely internal, and does not affect the force needed to effect the closing and unclosing movements of the valve as a whole. Due to the presence of the removable plug 39, the screws can be reached for adjustment from time to time to bring the parts into proper adjustment The plug 39 carries the outwardly extending set pin or stop 55$^a$ which is provided with the set screw 56$^a$ by which it may be locked in adjusted position. The clearance between the inner end of this set pin and the stem 49 is slight, being only a few hundredths of an inch, to permit full opening and closing movements of the disk valve under limited control.

The arms 42, 43 and 44 which extend out from the high pressure chamber 41 are carried by the stems 57$^a$, 58 and 59, respectively. These are threaded through the floors of recesses 60, 61 and 62 formed in the wall of the chamber 28, so that these screws may be reached from the outside of the device for adjustment and change without having to completely disassemble the device. Each of the stems 57$^a$, 58 and 59 is threaded through both the floor of the chamber recess and the arm of the high pressure valve chamber; and in order to be able to secure adjustments of the arm positions by merely turning the screws, these screws are provided with reverse threads on their two ends, so that turning the screw serves to draw the arm towards the floor, or vice versa, depending on the direction of such turn. Lock screws or nuts 63, 64 and 65 are provided on the screws as shown.

There is a high pressure supply tube connected into each of the high pressure chambers 41, these being the tubes 66 and 67. They are passed through the chambers 25 and 26 in gas tight manner, the details of which need not be disclosed, as any suitable form of such connection may be used.

The chamber 25 and 26 are provided with the delivery openings 68 and 69 through which the low pressure gases are delivered to the mixing valve and chamber, presently to be explained. These openings are preferably of relatively large size due to the fact that the gas volumes which they handle are enlarged in proportion to the expansions taking place in the reducing valves. It will be understood, however, that these delivery pressures are equal, as will be presently explained.

It will be understood that in operation the high pressure gas enters the chamber 41 where it exerts pressure against the diaphragm 45 and against the valve member 54–57. The areas of the diaphragm and of the valve member are equal so that these pressures balance each other, and therefore the opening and closing of the valve will be easily effected and is controlled by external forces. Means are provided for exerting force against the inner end of the stem 49, thereby tending to open the valve, whereupon high pressure gas is permitted to flow into the chamber 28 and connected parts and build up pressure therein. This pressure will be exerted against the diaphragm 33–35, and tend to force the same outwardly or into the central chamber 30, thereby seating the valve. Such seating of the valve will occur when the outward pressure of the diaphragm balances or slightly overcomes any unseating force against the stem 49.

It will be noted that the two reducing valves are so placed that they act in opposition to each other, and that the seating movements of the two stems are towards each other, and that the unseating movements of said stems are away from each other. Furthermore, by making the parts of the two reducing valves duplicates, it will be seen that the delivery pressures at which they will act will be equal, so that the reduced pressures of the two gases will be equal.

Between the inner ends of the two stems 49, and within the chamber 30 I place a control member and spring device for controlling the two valves, and also for ensuring balancing of the two valves against each other. For this purpose there is secured a head block 70 to the inner end of one stem 49, said head block carrying the two tapered rollers 71 and 72 which are journalled radially in the head block. The inner end of the other stem 49 of the other reducing valve carries the head block 73 which has the flat and radially extending surface shown in FIGURE 7. There is another control block 74 located between the head blocks 70 and 73, said control block 74 being provided with cam surfaces 75 and 76 in position to receive the rollers 71 and 72 (see FIGURES 7, 9 and 10). A ball thrust bearing 77 is placed between the head block 73 and the back face of the control block, since these parts have relative movement. It will be understood that the stems 49 are held against rotation since they are securely locked to their diaphragms but they have slight back and forth movement.

When the two reducing valves are in operation, their stems 49 are forced toward each other, and thereby their is created a tendency to rotate the control block back to an initial position in which both of the reducing valves are seated. By forcibly turning the control block the two stems will be forced apart, thereby unseating one or both of the valves, and high pressure gas will be expanded into the two chambers 28, building up pressure therein, until finally the forces against the diaphragms 33–36 will be sufficient to cause the control block to rotate backwardly against the force which turned it forwardly, and finally both of the valves will be seated again.

There is a sleeve 78 journalled to the neck 79, which neck is carried by the flange 80 in stationary manner. The sleeve 78 carries the outwardly extending flange 81, and also carries the worm gear 82 by which the parts are controlled. There is placed a suitable spring between the control member 74 and the flange 81, so that by turning the worm gear and flange 81, the spring will be placed under force or loaded, and thereby tend to turn the control member 74 with a force depending on such spring loading. Thus the control member is placed under spring force of adjusted amount, and at the same time there is established a yieldable connection to the control member so that the same can yield back and forth as one or both of the reducing valves functions.

There is a control shaft 82ᵃ extended through the chamber 30, so that said shaft extends to the outside of the chamber at each side, but passes close to the worm gear within the chamber. The worm 83 is mounted on said shaft within the chamber and in mesh with the worm gear. One end of the control shaft carries the hand crank 84 by which the shaft is turned to adjust the device for predetermination of the value of the reduced pressure of the delivered gases; or said shaft may be turned in any other convenient manner as will be presently explained.

It will be noted that the main moving parts of the device which are subject to frictional contact are contained within the chamber 30, and also that certain of these parts should be so placed that they can be readily reached for adjustment from time to time. I have therefore provided the chamber 30 with the removable plate 85 which, when removed, gives access to the chamber through a large bottom opening, ample to permit ready access to those parts which may require adjustment in the initial assembly of the device, or afterwards. Also, suitable lubricant may be placed within the chamber 30 to such amount as will effectively lubricate the parts contained therein, thereby ensuring very sensitive operation of the cams, and other parts subject to movement. In this connection it may be noted that normally it is not necessary to provide for more than a few hundredths of an inch movement of the valves 54–57—in some cases not over a hundredth of an inch—and therefore the slight quivering or hunting back and forth motion of the control member 74 as the valves are in use, will be only a few degrees of arc, the cams being of suitably steep taper. Thus a very sensitive device is produced, and one which will maintain the pressures of the delivered gases equal and constant to a very small degree of tolerance.

Figure 1:
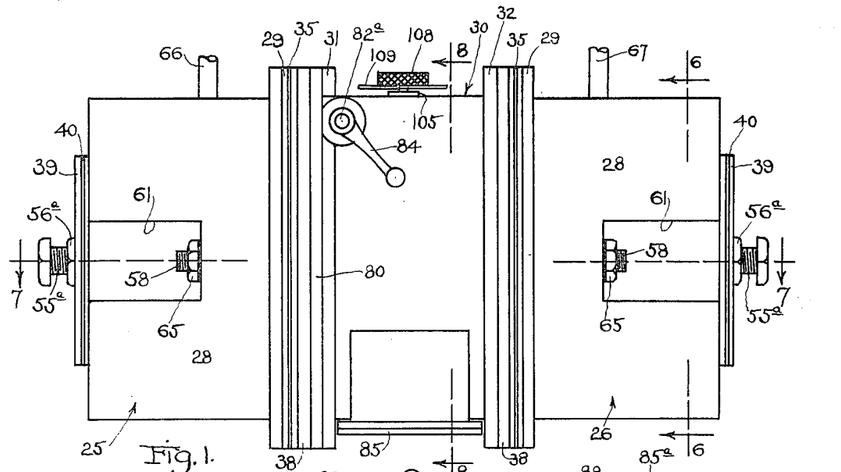
FIGURE 1 shows a front elevational view of the assembled dual or duplex pressure reducing valve unit.
Figure 2:
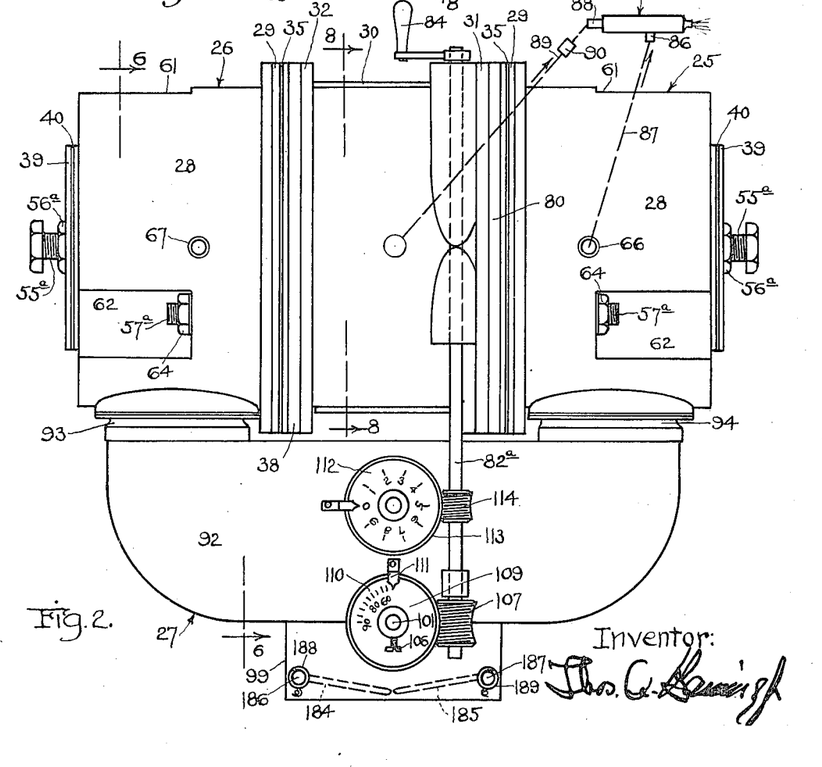
FIGURE 2 shows a top plan view corresponding to FIGURE 1 but with the unit rotated 180 degrees in the top plane viewing.
Figure 3:
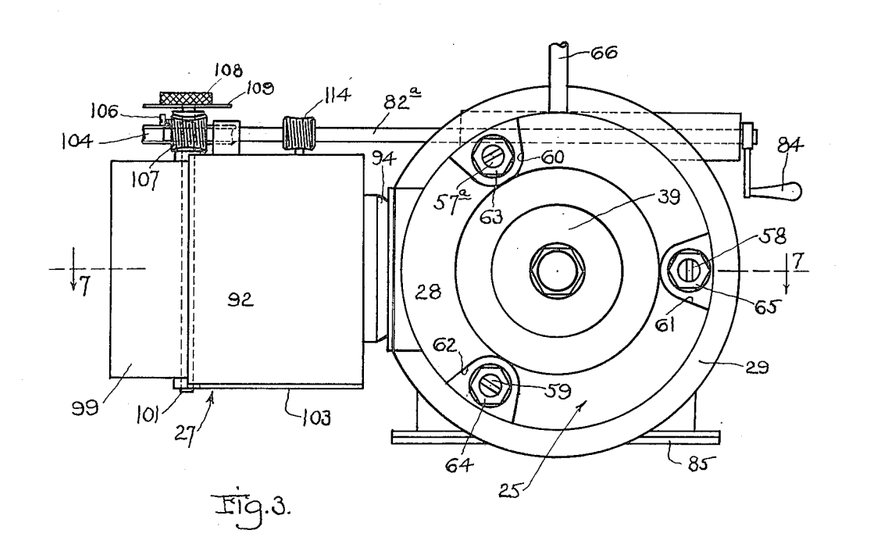
FIGURE 3 shows a left side view corresponding to FIGURE 1.
Figure 4:
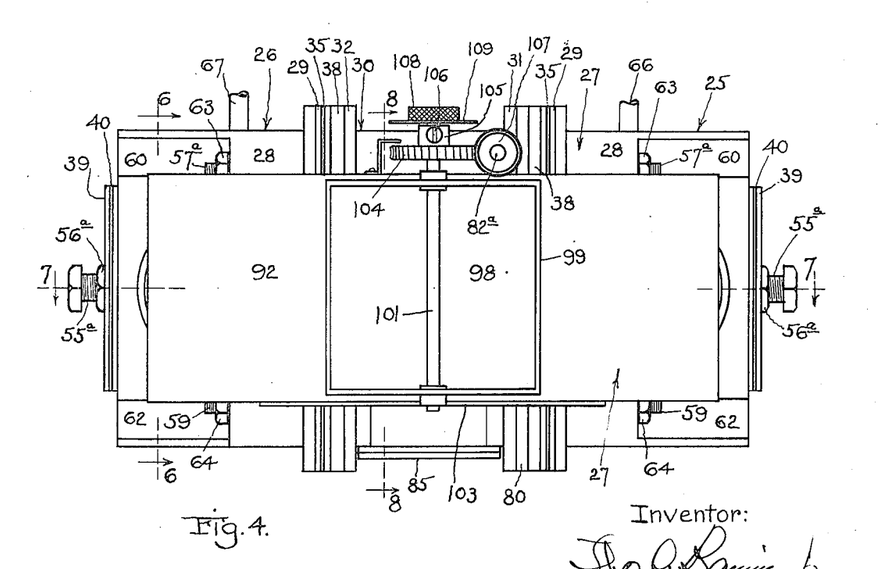
FIGURE 4 shows a back or delivery end view corresponding to FIGURE 3.
Figure 5:
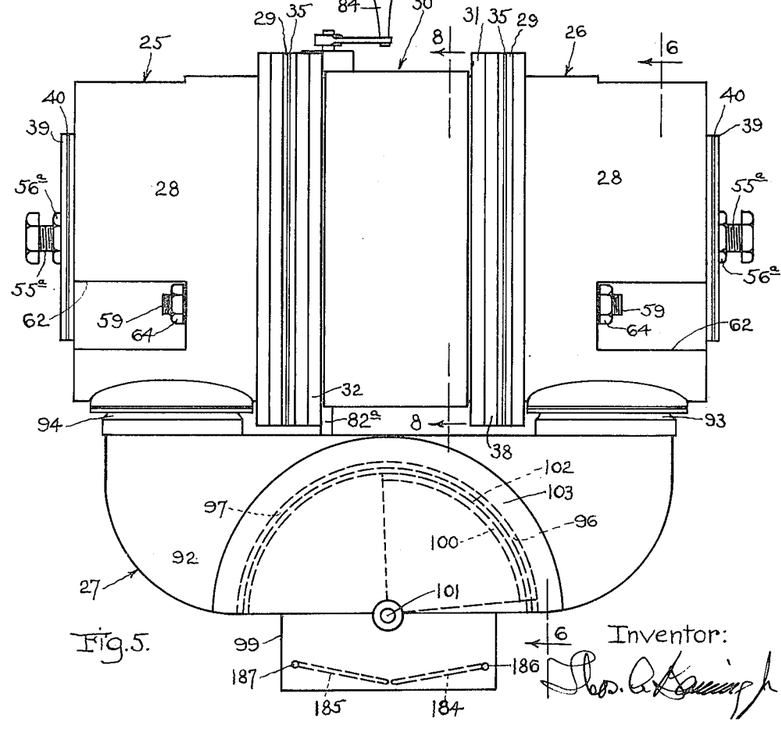
FIGURE 5 shows a bottom plan view corresponding to FIGURE 2, when the unit is rotated 180 degrees about a central horizontal axis parallel to the top of the unit.
Figure 6:
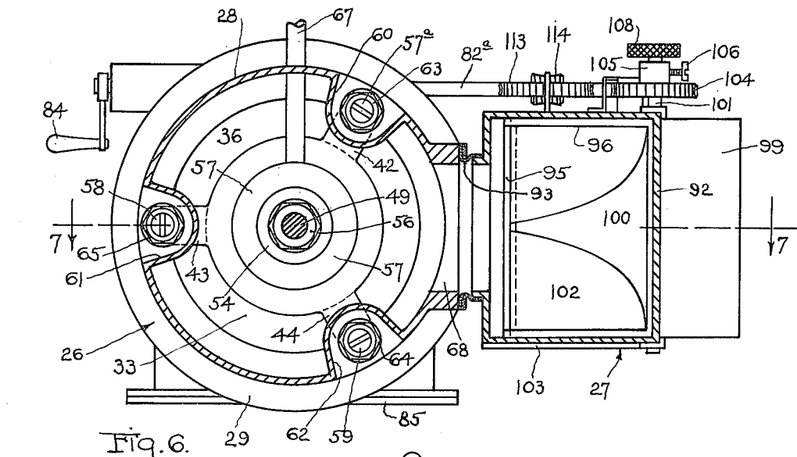
FIGURE 6 shows a cross-section on the lines 6—6 of FIGURES 1, 2, 4, 5 and 7, looking in the directions of the arrows, the parts being set to the low-pressure delivery position, and with the ratio controlling valve fully closed against one component (of gas or other fluid), and fully opened to the other component.
Figure 7:
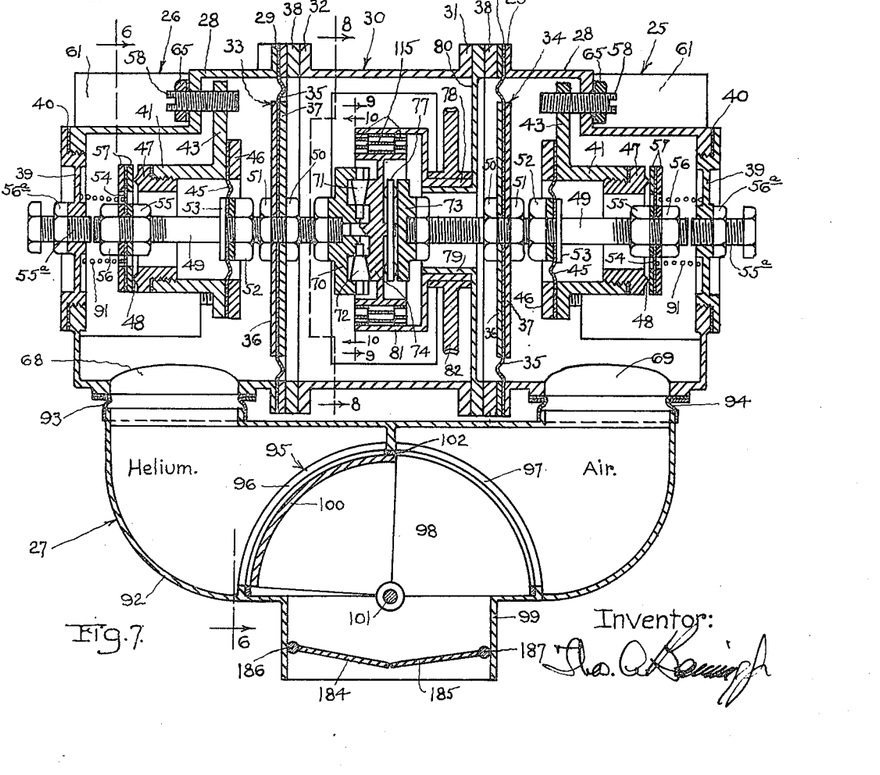
FIGURE 7 shows a plan section on the lines 7—7 of FIGURES 1, 3, 4, 6 and 8, looking in the directions of the arrows; with the ratio controlling valve in position fully closed against one component, and fully opened to the other component.
Figures 8, 9, 10, 11:
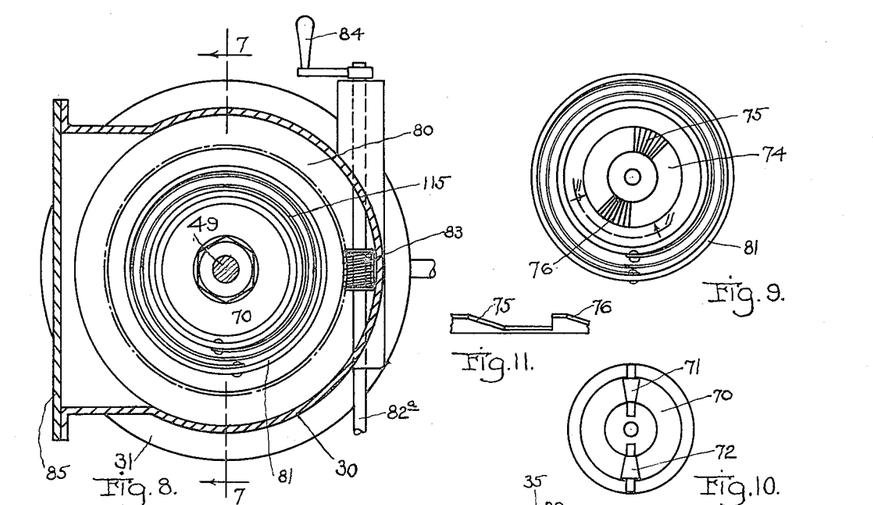
FIGURE 8 shows a cross-section on the lines 8—8 of FIGURES 1, 2, 4, 5 and 7, looking in the directions of the arrows; and it shows especially the spring control for controlling the delivery pressures.
FIGURE 9 shows a fragmentary section taken on the line 9—9 of FIGURE 7, looking in the direction of the arrows; and it shows the control cam.
FIGURE 10 shows a fragmentary section taken on the line 10—10 of FIGURE 7, looking in the direction of the arrows; and it shows the roller holder and the rollers which operate the cam.
FIGURE 11 shows a fragmentary side view of the cam, developed, being a detail view; and being taken on the line 11—11 of FIGURE 9, looking in the direction of the arrows.
Figure 12:
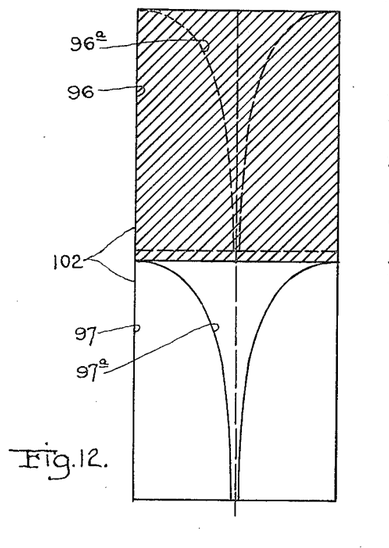
FIGURE 12 shows a development of the ports of the valve, showing the two ports of the mask developed into a plane; and one of the ports is shown fully closed by the shading, and the other port is shown fully open by the lack of shading.

It is here noted that the back pressure on the diaphragms 35–37 opposes the pressure existing within the chamber 28, and that the pressure which must be built up within said chamber 28 in order to seat the valve, is equal to the air pressure within the chamber 30 and against the diaphragm 35 plus the unseating force due to the preloading of the spring 115 of the control member. Therefore, in case of change of the pressure of the outside air (if the chamber 30 is in communication with the outside air), as for example, when ascending to higher altitudes, the calibration of the device will be changed, with corresponding change of the pressure above absolute zero at which the gases delivered by the reducing valves, will be so delivered. In order to prevent such result and to ensure constant operation and constant delivery pressure above absolute zero at various altitudes and various outside barometric readings, I have provided means whereby the chamber 30 may be evacuated, thus ensuring a constant absolute zero back pressure within such chamber 30. Under such conditions the operation will be solely affected by the preloading value of the spring. To produce such evacuation of the chamber 30 I have, in FIGURE 2 shown, diagrammatically, the syphon unit 85ᵃ of conventional design and operation; and the aspirating connection of such syphoning unit, 86, is connected by the tube 87 with one of the high pressure supply tubes 66 or 67, so that such syphoning unit will receive a constant supply of a small stream of high pressure gas, thus maintaining the desired vacuumized condition within the chamber 30. Conveniently such supply of high pressure gas may be derived from the high pressure air side of the supplies. The connection 88 of the syphoning unit, being the suction side of such unit, is then connected by the tube 89 with the interior of the chamber 30 to maintain the desired vacuum in such chamber. If desired a check valve 90 may be included in such tube 89, to prevent back flow of air therethrough since the vacuum, once produced within the chamber 30, will only be broken by leakage into such chamber 30. Accordingly, it is usually unnecessary to maintain the syphoning unit in continuous operation. Frequently the development of a vacuum within such chamber 30 will be unnecessary. However, when such vacuumized condition is produced and maintained in the chamber 30, the need of re-calibration of the operations of the unit will be avoided.

Instead of provision of the vacuumized condition within the chamber 30, for the purposes already stated, a spring 91 may be located behind the stem 49 at the location of each of the pressure-reducing valves, or behind each of the valve elements 54–57, each such spring being characterized to exert the same pressure in the valve seating direction as the total force exerted on the corresponding diaphragm 35–36 due to sea level pressure on one side of such diaphragm, and zero or vacuum pressure on the other side thereof. In either case disclosed above (the springs 91, characterized as above explained, or the vacuumized condition of the chamber 30), the control device spring 115 should be of such characteristics as to just balance the seating force produced by such a spring 91, or by vacuumized chamber 30, as a preloaded condition of such spring 115. By thus preloading such spring 115, the zero point of the pressure scale will be that corresponding to zero absolute pressure, so that the delivered pressures of the pressure-reduced gases will be readily measurable on a scale of absolute pressures. This scale will be explained hereinafter.

The gases delivered by the two reducing valves are to be brought together and mixed in predetermined proportions. The constructions for producing this result will next be explained, as follows:

The two delivery ports 68 and 69 for the low-pressure (pressure-reduced) gases are connected to the two ends of a manifold 92, such connections preferably being made by means including the flexible connectors 93 and 94. In the central portion of such manifold there is a semi-circular partial partition 95 having the large rectangular ports 96 and 97 which give access to the mixing chamber 98, also of semi-circular form. The delivery connection or pipe 99 leads from such chamber 98 for delivery of the mixed gases under the predetermined pressure, to the point of consumption or distribution.

Within the chamber 98 and directly behind the ports 96 and 97 there is placed the quadrant shaped valve 100 which can be rocked back and forth through approximately 90 degrees of arc, being for this purpose mounted on the vertical shaft 101. The valve normally stands in position to fully close one of the ports, for example 96, leaving the other port fully open; and as the valve is rocked from such defined position it gradually opens the port 96 and simultaneously closes the port 97, so that the relative amounts of port openings are changed during such rock. Manifestly, the incremental changes in the openings of the two ports will depend on the forms of such ports, as well as the form of the valve itself. I have provided a semi-circular mask 102 placed between the partial partition 95 and the valve member 100. Such mask can be inserted or removed conveniently by first removing the plate 103 from the bottom face of the manifold. This mask is shown, more or less diagrammatically and in development, in FIGURE 12 under the condition that the openings and closings produced by the rock of the valve through successive equal increments of rock, shall establish the ratios of gases called for by the curve B of FIGURE 13. That is to say, the valve will commence with full opening of the air port 97 for sea level pressure and simultaneous full closing of the valve 96 for zero delivery of helium (or other gas); and as the ratio between the two gases is to be changed, the valve 97 will close and the valve 96 will open, such incremental closings and openings being such that, for equal increments of valve arcuate movement, the ratios between the openings at any given valve position will correspond to the ratios of air and of helium (or other gas) which are to be delivered at various pressures or for other reasons. It will be seen from examination of FIGURE 12 that a given movement of the shaded area (representing the member 100) downwardly will uncover a given portion of the port 96ᵃ and will cover the same area of the port 97ᵃ; and due to the curved forms of the ports, these variations of areas so covered and uncovered, will be according to the form of the curve B. In case it be desired to provide for any other form or manner of variation of the ratios of the port openings, such result may be secured by substitution of another mask having the properly formed ports therein.

The valve 100 is directly connected to the control shaft 82ᵃ, such result being secured by the worm gear 104 having the hub 105 which can be secured to the shaft 101 by means of the set screw 106, the control shaft 82ᵃ carrying the worm 107 meshing with the worm gear 104. The valve shaft 101 is also provided with the knurled button 108 by means of which it may be turned by hand to secure independent valve movement, in case such operation be desired, the set screw having first been released.

Conveniently there is placed a thin plate 109 on the knurled head or button 108, the same being provided with the markings 110 (see FIGURE 2) to indicate valve openings by ratios for which purpose the pointer 111 is also provided overlying such scale markings. There may also be provided the dial 112 connected to the control shaft 82ᵃ by the worm gear and worm connection 113–114, so that this dial will turn with the control shaft movements, and therefore according to the changing delivery-reduced-pressure of the gases. Due to the fact that both of the dials 110 and 112 are moved by the control shaft, it is necessary to bring them into proper coordination. Accordingly, I have provided the set screw 106 already referred to, whereby this result may be produced. It may also be found necessary or desirable to substitute other dials from time to time, as for example, when the mask is changed. Such substitutions may also be readily made, with replacement of the plate 109 by another plate carrying proper markings, and properly calibrated.

The spring unit 115 (see FIGURE 7) of the control element preferably comprises three coiled spring elements, all coiling in the same direction, and the middle one being of double the strength of each of the two outside ones. The ends of such middle spring element are connected to the control member and to the flange 81 at positions 180 degrees from the positions of connection of the ends of the two outside spring elements. Thus the radial forces developed by the loadings of the spring elements will balance each other, with avoidance of friction components which would otherwise be generated due to each radial force components; it being understood that in the case of pressure reductions by large sized units the spring elements will probably be of considerable strength.

It will be understood that dual or duplex or multiple pressure reducing valves embodying various or all of the features of novelty herein disclosed may be used for many operations wherein one or more of the special operating conditions produced by the previously described units, may be specified. It is to be understood that I do not limit myself to any such special use, nor to the combination of my improved device with any particular additional equipment, except as I may limit myself in the claims to follow. However, since said improvements in the valve units have been devised to meet certain special conditions imposed by the nature of the additional operations with which such valves are used, I shall disclose briefly certain operations for which my valves are especially intended, and which operations impose special conditions of operation in the pressure-reducing valves per se. Accordingly, reference is now made to the following examples of special combinations of equipment incorporating these valves, and the special operations produced.

Figures 15, 16, 17:
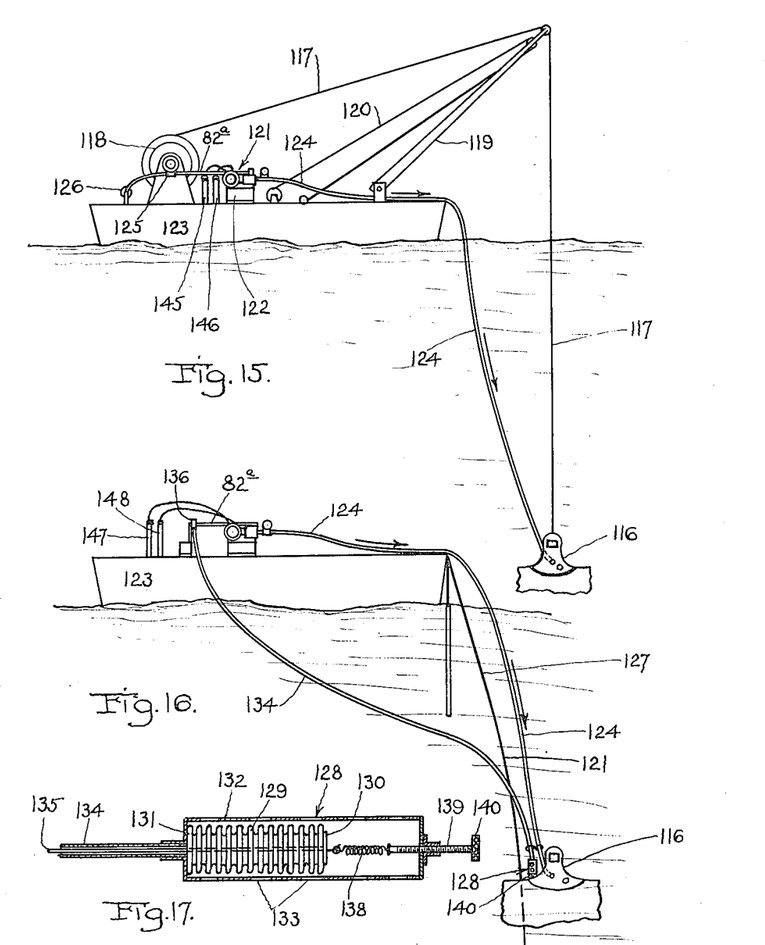
FIGURE 15 shows, diagrammatically, an arrangement for delivering mixtures of gases to a diver, according to one use of features of the present invention, the arrangement including means for controlling the reducing valve and the mixing valve by rotations of the drum which lower the diver's outfit.
FIGURE 16 shows a view similar to that of FIGURE 15, but with a pressure responsive device which is subject to the pressure of the medium in which the user of the mixture of gases is submerged, for controlling the reducing and mixing valves, and also for enabling the diver himself to make adjustments of such reducing and mixing valves.
FIGURE 17 shows a longitudinal section through the pressure responsive device included in the arrangement shown in FIGURE 16.

In FIGURE 15 I have shown, more or less diagrammatically, the application of certain features of my invention to the case of a diver's outfit for deep-sea diving operations. In this case the diver's helmet is shown at 116. It is provided with the usual connection for supply of compressed air or the like, and with the usual port for escape of the used air or atmosphere into the water. In this figure I have shown the diver's outfit as being lowered by the line or cable 117, the same passing from the drum 118 over the end of the boom 119 controlled by the line 120. The pressure reducing and mixing valve device herein disclosed is shown in outline at 121 mounted on the table 122 of the scow 123. The delivery hose 124 for the controlled atmosphere from the reducing and mixing device extends down to the diver's helmet 116 in the usual manner for supply of the atmosphere thereto, in controlled pressure and mixture form. For this purpose the control shaft 82ᵃ of the present device is connected to the drum 118 by a gear connection 125 so that as the drum rotates to lower or raise the diver's outfit, the control shaft will be turned back and forth to either increase or reduce the delivery pressure of the mixture, and at the same time vary the proportions of the mixture supplied to the diver. If desired, an indicator 126 may be connected to the shaft 82ª to give a direct reading of level of the diver's outfit below the surface of the water.

Figure 18:
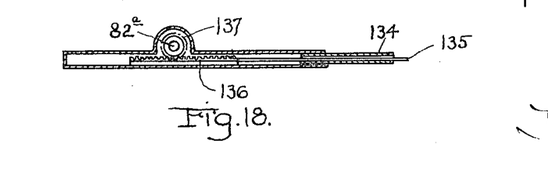
FIGURE 18 shows the gear connection between the longitudinally movable core of the flexible shaft, and the adjustment shaft of the pressure reducing and mixture controlling unit herein disclosed.

In the arrangement shown in FIGURE 16 the control or lowering cable is eliminated, and the diver is allowed to lower himself by the line 127 in the well understood manner. In this case there is provided a device 128 for controlling the control shaft 82ª of the pressure reducing and mixture controlling unit. This device 128 is shown in FIGURES 17 and 18. It includes the Sylphon 129 of flexible metal, closed at its outer end 130, and having its inner end 131 anchored within the casing 132. This casing is perforated as shown at 133 to allow the pressure of the water to be exerted on the Sylphon, which will thereby be compressed in proportion to such water pressure, as due to the depth at which the device is located. There is a water-tight casing, of flexible nature 134, secured to the anchored end of the Sylphon, and which casing is carried up to the position of the scow 123. There is a flexible shaft 135 in the casing 134, the lower end of this shaft being connected to the movable end of the Sylphon, and the shaft extending up through the casing to a connection with the control shaft 82ª of the pressure reducing and mixture controlling device. Since the flexible shaft moves back and forth with variations of the pressure exerted on the Sylphon, it is necessary to convert such back and forth movements into rotary movements of the control shaft 82ª. This is done by the rack and pinion arrangement shown in FIGURE 18. In this case the rack 136 is connected to the end of the flexible shaft 135, and the pinion 137 is connected to the control shaft 82ª, so that the back and forth movements of the flexible shaft are properly converted into the rotary movements of the control shaft.

In the casing 132 there is the tension spring 138, connected to the free end of the Sylphon and also to an adjustment screw 139 having the knurled head 140 which can be adjusted by the diver from time to time from his position beneath the surface of the water, in case he desires to increase or reduce the pressure and mixture which he is receiving, and independently of the exact water pressure existing at his then level.

Figure 19:
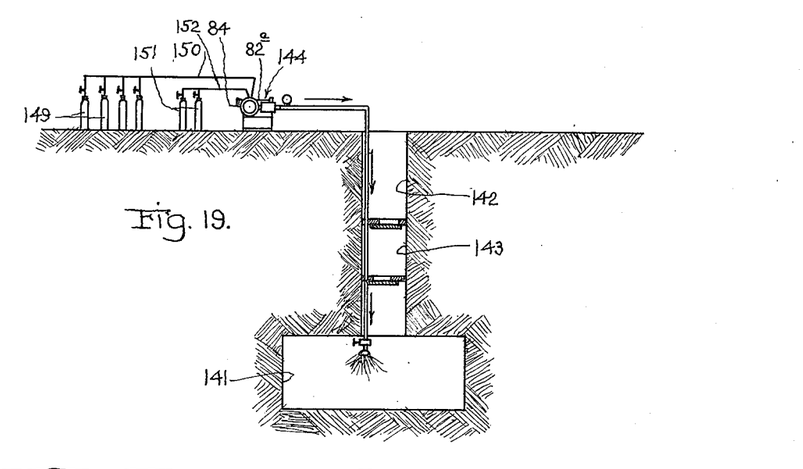
FIGURE 19 shows, diagrammatically, an arrangement for delivering the mixture of gases from the pressure reducing and mixture controlling devices, to a caisson, with an intervening lock for permitting access to and escapement from the caisson while maintaining pressure therein.

In the arrangement shown in FIGURE 19 I have shown the present invention as applied to a caisson or other pressure chamber 141. The same is shown as being connected to the ground level by the shaft 142. The lock 143 is also shown for permitting access to and departure from the chamber 141 while maintaining pressure within said chamber. The pressure reducing and mixing device of the present invention is shown at 144 at the ground level.

In each of the applications hereinbefore illustrated I have provided means for delivering to the device of the present invention each of two gases under compression. Thus, in FIGURE 15, the flask or container 145 delivers one gas, for example, natural air under heavy pressure, to one of the reducing valves; and the other flask or container delivers another gas, for example helium, under heavy pressure, to the other reducing valve. These flasks or containers may be of the conventional form, or they may be compressors delivering their gases directly to the reducing valves. In the arrangement of FIGURE 16 the flasks or containers 147 and 148 are for purposes similar to those performed by the flasks 145 and 146 of FIGURE 15. In the arrangement shown in FIGURE 19 I have shown several flasks or containers 149 connected to a common manifold 150, which is in turn connected to one reducing valve, for supply of gas thereto, and several other flasks or containers 151 connected to another common manifold 152 which connects to the other reducing valve for delivery of gas thereto. Of course all of the flasks 149 contain the same kind of gas, and the flasks 151 all contain another kind of gas, so that as one flask after another becomes exhausted it may be cut off, and another of its series may be cut into service to provide uninterrupted supply of that gas.

Figure 20:
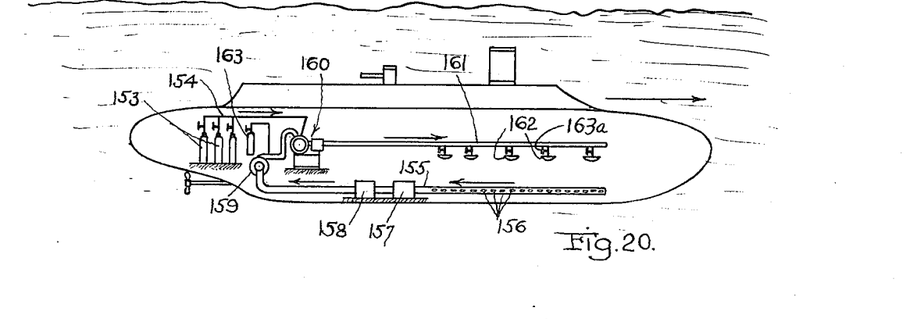
FIGURE 20 shows, diagrammatically, a submarine boat installation provided with equipment including features of the present invention for providing the controlled and renewed mixture of gases, required therein.

In the arrangement shown in FIGURE 20 I have shown an installation for supply of the desired fresh atmosphere to the interior of a submarine or the like. In this case there is a series of oxygen flasks 153 connected to a common manifold 154, which in turn connects to one of the pressure reducing valves. There is a common manifold 155 extending along the interior of the submarine for receiving the used atmosphere from the interior thereof. This manifold 155 has the openings 156 along its length to permit the used atmosphere to enter at various points along its length, so that all of the used atmosphere is collected in the manifold and delivered to a common point.

There are the scrubbers or cleaners 157 and 158 placed in the manifold 155, and preferably in series connection. One of these contains suitable material such as lime for removal of the carbon dioxide from the used atmosphere, and the other contains suitable material such as $CaCl_2$ or $NaOH$ for removal of moisture from the used atmosphere. The purified and dried gas is thus delivered to a blower or compressor 159, by which it is delivered to one of the reducing valves of the reducing and mixing unit 160. In this unit 160, the construction of which has been set out in detail herein, the purified and dried atmosphere is mixed with the proper proportion of fresh oxygen, according to the setting of the mixing valve of the device 160, and the freshened atmosphere is then delivered through the manifold 161, which extends along the interior of the submarine, to locations where the atmosphere is to be delivered, the manifold 161 being provided with the delivery openings 162 at various points along its length. These may take the form of nozzles or the like as illustrated. If desired, each of these nozzles may be provided with a control valve 163ª so that the delivery of the fresh atmosphere to different points may be controlled according to varying needs from time to time. It will be seen that with this arrangement, the inert portion of the atmosphere is recirculated from time to time, and the used oxygen is removed therefrom, together with the moisture, the oxygen content being renewed continuously as needed, in such proportions as may be determined by the setting of the mixing valve.

If desired, additional quantities of inert gases may be introduced into the system from time to time in order to make up for losses thereof due to leakage, or losses incurred at times when the craft may be opened at the surface, or due to other causes or conditions. For supply of such additional quantities of inert gases I have shown the flask 163 containing inert gases under heavy pressure, and which flask may be connected into the return line leading to the reducing and mixing unit 160, so that the above result may be secured.

In the arrangement shown in FIGURE 21 I have shown the features of the present invention as applied to a closed chamber, such as the cabin of an aeroplane, in which the pressure of the atmosphere frequently falls materially below that existing at sea level. This is the cabin 164, provided with the rooms 165, 166 and 167 and 168, for the passengers, the pilot, a toilet, and for baggage, respectively. The reducing and mixing valve device is shown at 169. The delivery manifold, 170, extends through the various rooms or chambers into which the controlled atmosphere is to be delivered, for which purpose there are shown the various delivery nozzles 170ª located at convenient places. For example, one of these nozzles may be provided adjacent to each of the passenger seat locations, and provided with a valve whereby the delivery of the atmosphere at such location may be controlled. These locations are shown by the windows 171.

There are shown the flasks 172 and 173 for compressed oxygen and compressed natural air or compressed inert gas, respectively, for delivery of the same to the reducing valves of the device 169. By this arrangement it is possible to ensure delivery of a mixture into the cabin, containing increased proportions of oxygen as compared to the proportion of oxygen contained in the natural air, all as explained previously herein. Thus, the passengers and other occupants of the airplane or other vehicle will receive at each breath a number of molecules of oxygen substantially equal to the number thereof received when breathing natural air at sea-level pressure. This result is also accomplished without the need of placing the interior of the airplane or other vehicle under greater pressure than exists at the elevation at which such vehicle is flying. This will avoid the necessity of making such vehicle airtight, and will also make unnecessary the provision of a cabin structure of sufficient strength to resist the internal pressure which would be produced in the case of a pressurized cabin. It will be understood that in normal service there will actually be a small leakage from the cabin through the window frames and at other points, so that some loss of used atmosphere will occur.

Referring again to FIGURE 13, the curve C which is carried backwardly from the sea level pressure line A, falls to zero at substantially $\frac{1}{5}$ atmosphere pressure above absolute zero, indicating that at such pressure the breathed atmosphere should be 100% oxygen (but containing only the same number of molecules of oxygen per cubic centimeter as natural sea level pressure air). At pressures between $\frac{1}{5}$ atmosphere (absolute) and sea level pressure, the percent total oxygen is less, and the difference is made up of inert gas as shown by the space below the line C. The total oxygen at any pressure less than sea level pressure, comprises the space above the line C; and in case the mixture is ordinary or natural air plus added oxygen, the total oxygen will comprise the oxygen of such natural air (shown as the space between the curves C and D), plus the added oxygen (shown as the space above the curve D). The atmosphere supplied to passengers and crew at altitude in the vehicle, may be supplied to each person by means of a helmet instead of by control of the entire atmosphere of the interior of the cabin, with suitable connections from the manifold 170 or the mixing valve device 169, to each such helmet.

Figure 21:
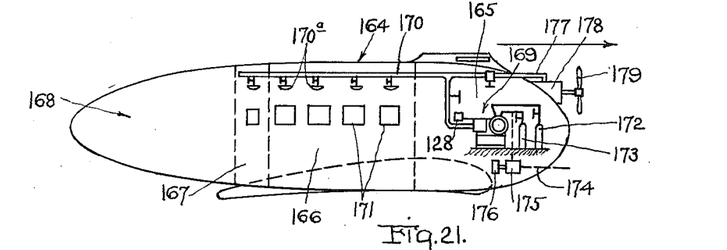
FIGURE 21 shows a diagrammatic view of the cabin of an aeroplane provided with equipment including features of the present invention for providing the controlled and proportioned mixture of gases according to features of the present invention, and to provide an increased percentage of oxygen under control when flying at high altitudes where the rarification of the air normally reduces the oxygen supply available for human consumption.

In the arrangement of FIGURE 21 I have also shown the connection 174 through which outside air may be drawn by means of the blower 175 driven by the motor 176, to deliver such outside air to one of the reducing valves, if desired, in order to supplement or replace delivery of air or inert gas from the flask 173. I have also shown a connection 177 extending from the manifold 170 to the intake of the power motor 178 for the propeller 179, so that thereby it is possible to deliver to the internal combustion engine or motor 178 at all times a mixture including a proportion of oxygen such that it contains the same number of molecules of oxygen per cubic centimeter as natural air at sea level pressure, or other predetermined pressure, notwithstanding the fact that the aeroplane or dirigible may be operating at high altitudes where the air pressure is materially lower than at sea level. This will make it possible for such internal combustion engine to receive full oxygen supply and deliver full power, without the need of using superchargers or other like equipment.

In some cases it may be desirable to provide a slight amount of back pressure on the delivery connection 99 through which the mixed gases are delivered. For example, in case of delivery of gases at pressures only slightly above that of the surrounding atmosphere, or even at the pressure of the surrounding atmosphere, the reducing valves may not operate with maximum sensitiveness. In order to compensate for this condition, I have shown in several of the figures the wing valve including the wings 184 and 185 in the delivery connection, the same being pivoted on the shafts 186, and 187, respectively, so that these wings may swing towards and from each other to control the size of the delivery opening. Light springs 188 and 189 are provided on these shafts 186 and 187, tending to keep the wings in closed position. The tension of these springs may be sufficient to create the desired amount of resistance to the flow of the mixed gases to build up the desired back pressure; but as soon as the mixed gases pass the wing valve such gases will fall to the intended delivery pressure, so that they will be delivered at the pressure desired.

I claim:

1. In a device of the class described, the combination of two opposing and aligned pressure reducing valves, each including an outer low pressure chamber with a flexible wall on the inner face of such low pressure chamber and each high pressure chamber being located within the corresponding low pressure chamber, a tubular high pressure supply duct from the exterior of the low pressure chamber to the interior of the corresponding high pressure chamber; the flexible walls of the low pressure chambers comprising opposing flexible walls of a control chamber intermediate between the two pressure reducing valves; a cylindrical enclosing wall connecting together the perimetral portions of the opposing low pressure chambers; a flexible wall comprising the face of the high pressure chamber of each reducing valve which wall is proximate to and opposite to the flexible wall of the corresponding low pressure chamber; valve means in each high pressure chamber in alignment with and opposite to the flexible wall of such high pressure chamber, such valve means controlling exit of gas from such high pressure chamber into the corresponding low pressure chamber; axially aligned control stems connected to the valve means of the high pressure chambers; each such control stem extending in gas tight fashion through the flexible walls of the high and low pressure chambers of the corresponding pressure reducing valve to a location in proximity to the control stem of the opposite pressure reducing valve; companion surfaced elements secured to the proximate end portions of the two control stems, the surface of at least one of such surfaces being cammed with its camming elemental portions extending in arcuate fashion with respect to the control stems; a stem controlling rotatable element intermediate between such companion surfaced elements, constituted to drive the control stems axially from each other during rotation of the rotatable element in one direction, with permissive restoration of the control stems towards each other and rotation of the rotatable element in the opposite direction; torque producing spring means having one end in connection with the control stem controlling element, adjustable anchor means for the other end of the spring, said spring means being constituted to urge rotation of said controlling element in direction to produce increased separation of the two control stems from each other; together with means to adjust the anchor means to correspondingly adjust the urging force of the spring in the direction of its urge.

2. A device as defined in claim 1; wherein the control chamber is substantially gas tight.

3. A device as defined in claim 2; together with means to evacuate said control chamber to a pressure lower than atmospheric, with corresponding closure of the high pressure valve at a pressure above absolute zero corresponding to the evacuation of the control chamber.

4. A device as defined in claim 3; wherein the evacuation means is constituted to produce a substantially complete vacuum within the control chamber.

5. A device as defined in claim 1; together with spring means comprising a portion of each pressure reducing valve, in connection with the high pressure valve seating element of such valve urging seating of such high pressure valve.

6. A device as defined in claim 5; wherein the valve seating urge of such spring acts against the high pressure valve unseating urge produced by the gas pressure above absolute zero existing within the control chamber.

7. In a device of the class described, the combination of two opposing and aligned pressure reducing valves, each including an outer low pressure chamber with a flexible wall on the inner face of such low pressure chamber and each high pressure chamber being located within the corresponding low pressure chamber, a tubular high pressure supply duct from the exterior of the low pressure chamber to the interior of the corresponding high pressure chamber; the flexible walls of the low pressure chambers comprising opposing flexible walls of a control chamber intermediate between the two pressure reducing valves, a cylindrical enclosing wall connecting together the perimetral portions of the opposing low pressure chambers; a flexible wall comprising the face of the high pressure chamber of each reducing valve which wall is proximate to and opposite to the flexible wall of the corresponding low pressure chamber; valve means in each high pressure chamber in alignment with and opposite to the flexible wall of such high pressure chamber, such valve means controlling exit of gas from such high pressure chamber into the corresponding low pressure chamber; axially aligned control stems connected to the valve means of the high pressure chamber; each such control stem extending in gas tight fashion through the flexible walls of the high and low pressure chambers of the corresponding pressure reducing valve to a location in proximity to the control stem of the opposite pressure reducing valve; spring means between the proximate ends of the control stems urging separation movement between said stems; means for adjusting the separating urge of such spring means; and means to pre-set such adjusting means.

8. A device as defined in claim 7; wherein the control chamber is substantially gas tight.

9. A device as defined in claim 8; together with means to evacuate said control chamber to a pressure lower than atmospheric, with corresponding closure of the high pressure valve at a pressure above absolute zero corresponding to the evacuation of the control chamber.

10. A device as defined in claim 9; wherein the evacuation means is constituted to produce a substantially complete vacuum within the control chamber.

11. A device as defined in claim 7; together with spring means comprising a portion of each pressure reducing valve, in connection with the high pressure valve seating element of such valve, urging seating of such high pressure valve.

12. A device as defined in claim 11, wherein the valve seating urge of such spring acts against the high pressure valve unseating urge produced by the gas pressure above absolute zero within the control chamber.

References Cited by the Examiner
UNITED STATES PATENTS

| | | | |
|---|---|---|---|
| 297,373 | 4/1884 | Freese | 137—505.18 |
| 330,263 | 11/1885 | Robertson | 137—505.18 |
| 1,191,397 | 7/1916 | Cave. | |
| 1,226,148 | 5/1917 | Walters | 128—144 |
| 1,265,134 | 5/1918 | Sundt | 137—16 |
| 1,665,145 | 4/1928 | Peltz | 137—100 X |
| 1,798,317 | 3/1931 | Eaton | 137—100 |
| 2,267,976 | 12/1941 | Hermann | 137—99 X |
| 2,313,797 | 3/1943 | Bailey | 137—100 |
| 2,593,988 | 4/1952 | Cousteau | 128—144 |
| 2,949,923 | 8/1960 | Clerc | 137—111 |
| 2,986,152 | 5/1961 | Bayer | 137—99 |

ISADOR WEIL, *Primary Examiner.*

JORDAN FRANKLIN, CLARENCE R. GORDON,
*Examiners.*